July 29, 1958
C. H. NEER
2,845,091
TANK CLEANING APPARATUS
Filed Jan. 18, 1954
3 Sheets-Sheet 1
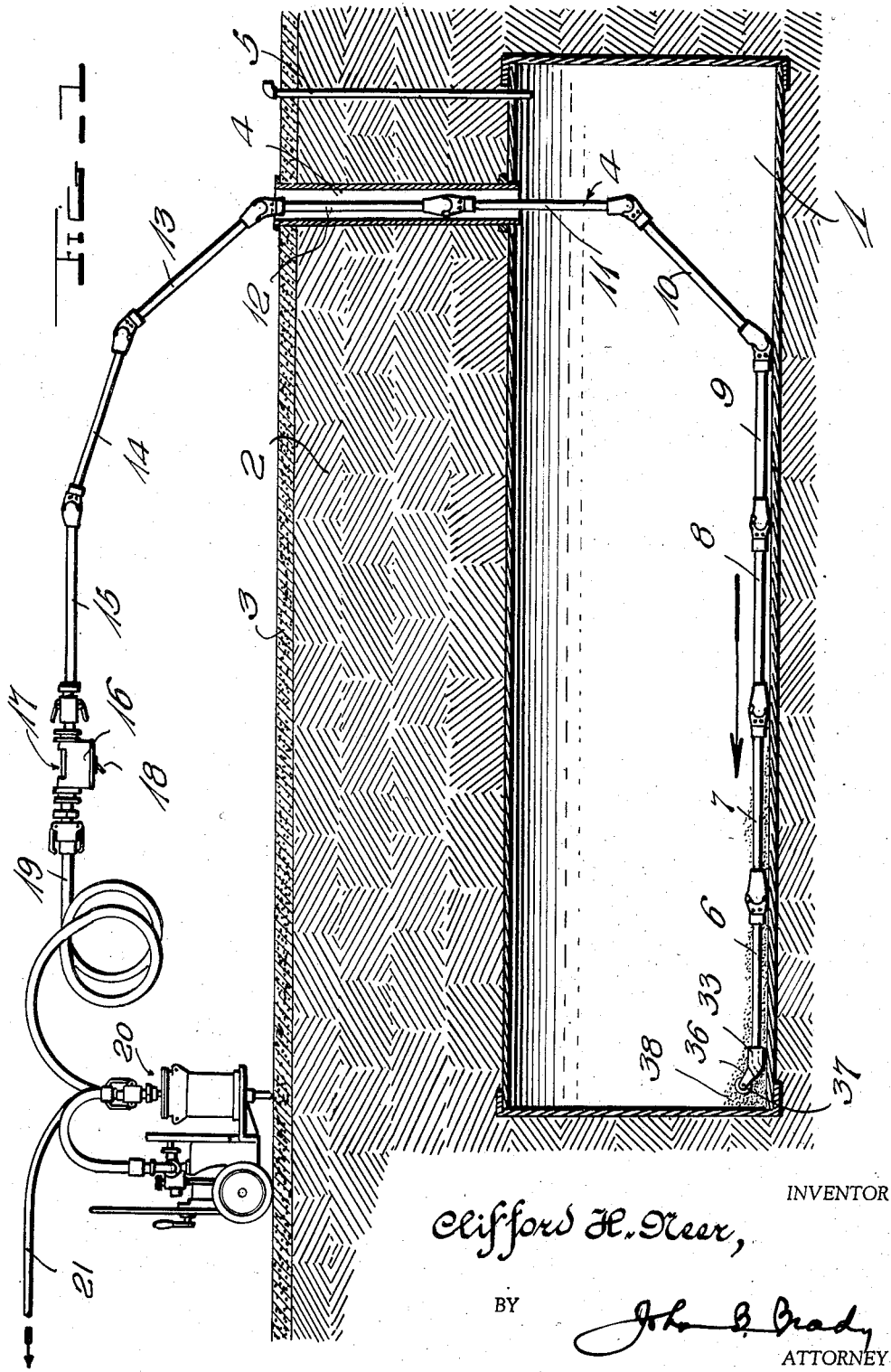
INVENTOR
Clifford H. Neer,
BY
John B. Brady
ATTORNEY

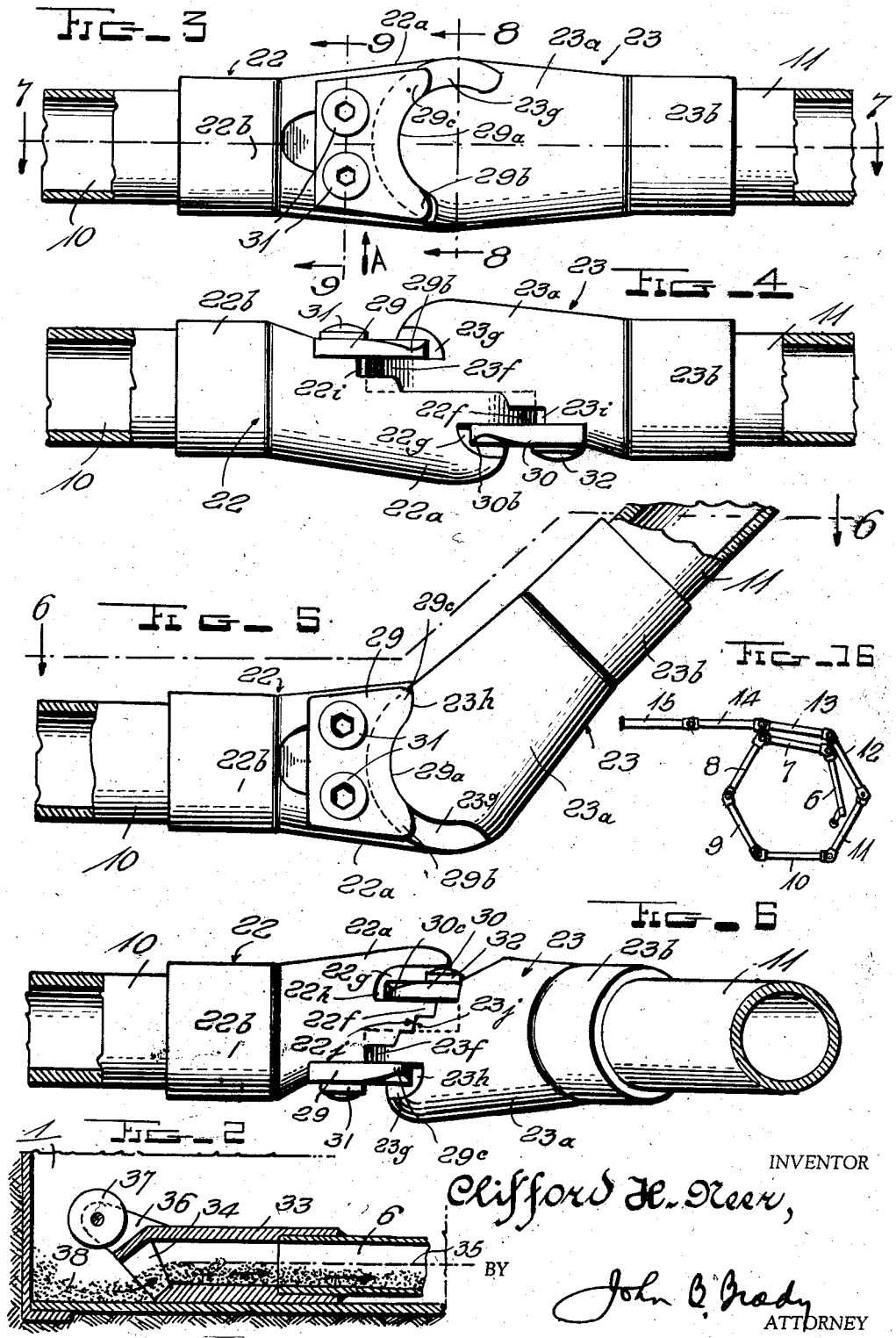

July 29, 1958        C. H. NEER        2,845,091
TANK CLEANING APPARATUS
Filed Jan. 18, 1954        3 Sheets-Sheet 3
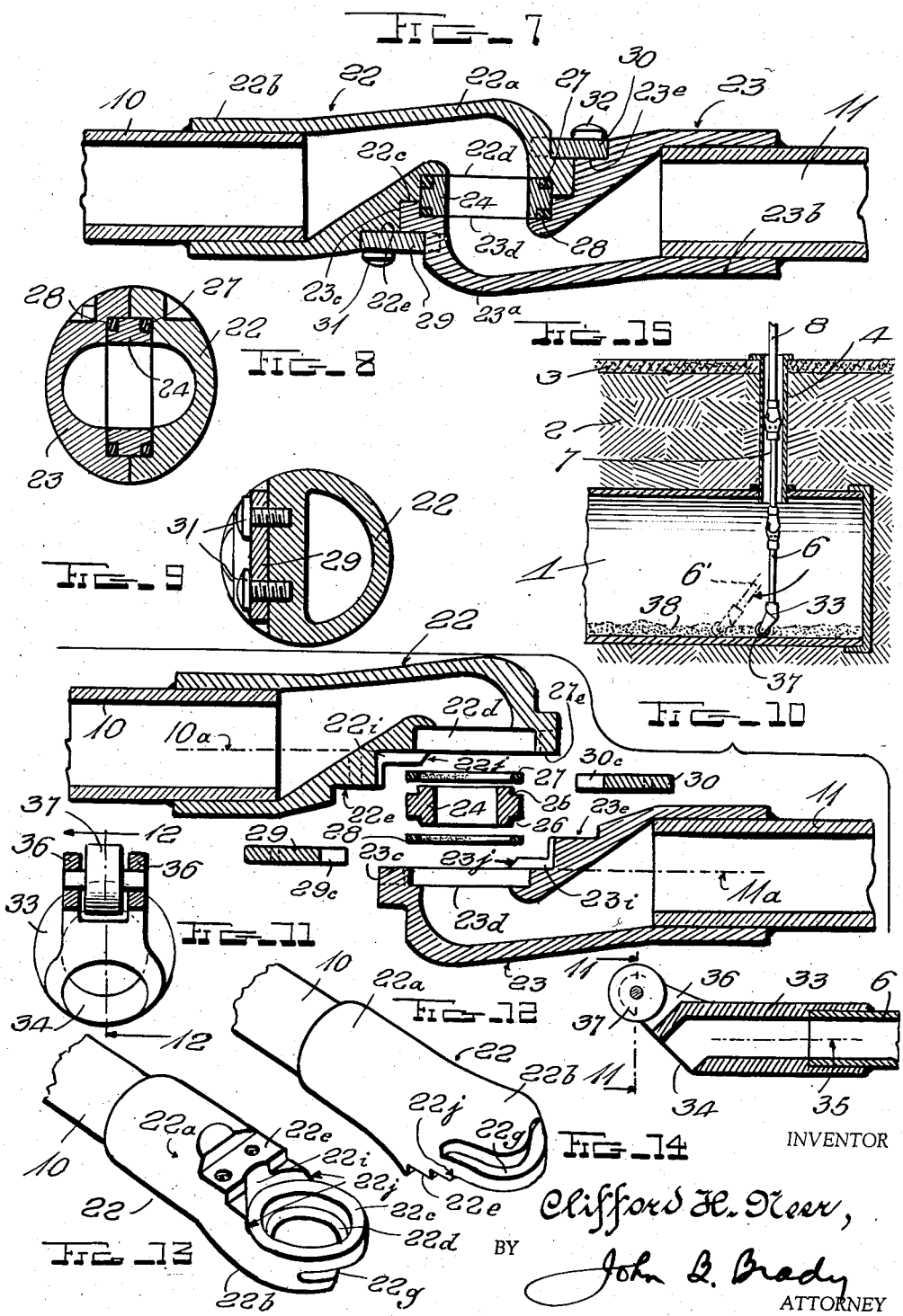
INVENTOR
Clifford H. Neer,
BY John B. Brady
ATTORNEY

United States Patent Office 2,845,091
Patented July 29, 1958

2,845,091

TANK CLEANING APPARATUS

Clifford H. Neer, Pikesville, Md., assignor to Maryland Engineering Company, Pikesville, Md., a co-partnership Application January 18, 1954, Serial No. 404,531

2 Claims. (Cl. 137—577.5)

My invention relates broadly to tank cleaning apparatus and more particularly to an apparatus for cleaning the inside of large buried tanks.

One of the objects of my invention is to provide a construction of tubular searching probe comprised of a multiplicity of series connected tubular rigid sections hingedly connected end-to-end and for connection to a suction system establishing a suction path for removing scale and sludge accumulating within a buried tank after extended periods of use.

Still another object of my invention is to provide a construction of tubular probe for connection to a suction system in which the probe is formed by a multiplicity of series connected rigid tubular members connected end-to-end to form a suction path for removing scale and sludge from the interior of tanks wherein the tubular members are hingedly connected end-to-end by means which restrict the direction of movement of the several sections with respect to each other unilaterally for manually directing the probe into and through the tank from a remote position.

A further object of my invention is to provide a construction of tubular probe consisting of a multiplicity of tubular sections hinged end-to-end through gasket means which insure a fluid-tight seal while permitting unilateral movement of the successive sections in feeding the probe through the supply pipe of a buried tank and for manipulating the probe in concealed positions within the tank from a remote position adjacent a suction pump for removing accumulated scale and sludge through the tubular sections of the probe.

Still another object of my invention is to provide a construction of sectionalized tubular probe in which each of the tubular sections are connected end-to-end for forming a suction path for removing scale and sludge through the probe where each of the sections of the probe are rigid and are proportioned in length so as not to exceed the maximum vertical height of the tank in which the probe is used, for thereby insuring the required shift in angular position of the interconnected rigid connections as the probe is forced into or removed from the tank during a suction cleaning process.

Still another object of my invention is to provide a construction of tubular probe consisting of a multiplicity of series connected rigid tubular sections connected end-to-end for forming a suction path for removing accumulated scale and sludge in which the ends of the sections are hinged through coacting hinge means permitting movement of the sections within the range of an acute angle between the limits of lineal alignment and approximately 60° thereto where the included angle between the sections is obtuse.

Still another object of my invention is to provide a construction of probe formed by a plurality of series connected hinged sections terminating in a suction pickup orifice extending at an angle to the axis of the terminating section of the probe and carrying a guide roller offset from the axis of the last section of the probe for a sufficient distance to provide a turning moment in the direction in which the sections of the probe are free to shift from a lineally aligned position, whereby the guide roller, when forced into abutment with the tank bottom as the probe is introduced into the tank, controls the angular shift of the sections of the probe through a range within the limits of an acute angle to insure the movement of the probe in the proper direction lineally of the bottom of the tank for exposing the orifice to accumulated scale and sludge at the bottom of the tank for effecting the removal thereof.

Other and further objects of my invention reside in the sectionalized construction of the suction search probe, hinge connection arrangements therefor, and guide roller terminus formed thereon, as set forth more fully in the specification hereinafter following by reference to the accompanying drawings, in which:

Figure 1 is a schematic view showing the probe of my invention in use for the suction cleaning of an underground tank in the removal of accumulated scale and sludge therefrom;

Fig. 2 is an enlarged fragmentary section of the terminus of the probe of my invention illustrating particularly the manner in which the apertured end of the probe gathers by suction pressure accumulated deposits of scale and sludge within the concealed bottom of the buried tank by manipulation from the surface above the tank;

Fig. 3 is an enlarged elevational side view partially broken away and illustrated in section showing one of the angular shiftable joints between the tubular sections of the probe of my invention;

Fig. 4 is a top plan view of the joint illustrated in Fig. 3;

Fig. 5 is a view similar to the view shown in Fig. 3 but illustrating the sections of the probe shifted to their maximum limiting relationship;

Fig. 6 is a top plan view of the joint in the shifted position illustrated in Fig. 5;

Fig. 7 is a longitudinal sectional view through one of the joints between adjacent sections of the probe taken on line 7—7 of Fig. 3;

Fig. 8 is a transverse sectional view taken on line 8—8 of Fig. 3;

Fig. 9 is a transverse sectional view taken on line 9—9 of Fig. 3;

Fig. 10 is a view showing the parts of the joint between two adjacent sections in separated spaced positions preparatory to assembly of the joint;

Fig. 11 is an end view of the terminus of the probe, the view being shown partially in section on line 11—11 of Fig. 12;

Fig. 12 is a fragmentary longitudinal sectional view on line 12—12 of Fig. 11, showing the terminus of the probe with the guide roller shown in side elevation;

Fig. 13 is a perspective view of the flanged end of one of the sections of the probe, looking within the recessed portion of the flanged end;

Fig. 14 is a perspective view of the flanged end of one of the probe sections similar to Fig. 13, but illustrated in the reverse position in order to show the periphery of the external flange on the end of the probe section;

Fig. 15 is a schematic view illustrating the unilateral operation of the sections of the probe and the manner in which the guide roller on the terminus of the probe directs the angular shift of the probe sections in the proper direction as the probe is forced into the tank for purposes of cleaning; and Fig. 16 is a view showing the probe partially packed for transportation which is facilitated by the 60° movement permitted between the adjacent rigid tubular sections into an approximate hexagonal package.

My invention is directed to a construction of probe for cleaning the concealed interior of buried tanks, such as gasoline service station buried tanks and fuel oil tanks. Many such installations have been in operation for an indefinite number of years, and perhaps, unknown to the proprietor or owner, have accumulated deposits of scale, sludge, dirt and other waste material which is normally pumped in the case of gasoline into the fuel tanks of vehicles, and in the case of oil into domestic and other oil burners. Such matter can only adversely effect the operation of vehicles or fuel oil burners and requires frequent renewal of filters. Moreover, unless the accumulation of dirt, scale, sludge and other foreign matter in buried tanks is removed periodically, ultimate corrosion, destruction and loss of the tank will result while the interim contamination reduces the efficiency of use of fuels pumped from the tank.

I have investigated tank cleaning apparatus heretofore available and have devised the tank cleaning apparatus set forth herein to overcome deficiencies, in such prior apparatus, heretofore experienced. In the apparatus of my invention I provide a probe constructed of a multiplicity of series connected rigid tubular sections connected end-to-end through a suction-tight joint capable of maintaining a flow of scale, sludge, dirt and other waste material substantially without loss or leakage from the pickup terminus end of the probe to the suction or vacuum pump. The tubular rigid sections of the probe each have a length less than the height of the tank to be cleaned so that, as the probe is introduced into the tank, the sections thereof may be angularly directed in the proper direction for reaching the remote portions of the tank by pressure exerted lineally through the sections of the probe from a remote position above the tank. To further facilitate the proper directing of the probe I provide a terminus including a pickup orifice extending at an angle to the axis of the terminating section of the probe and carrying a guide roller offset from the axis of the last section of the probe for a sufficient distance to provide a turning moment in the direction in which the sections of the probe are free to shift from a lineally aligned position whereby the guide roller, when forced into abutment with the tank bottom as the probe is introduced into the tank, controls the angular shift of the sections of the probe in the proper direction. In many probes which I have developed there are as many as sixteen rigid tubular sections hinged end-to-end, each having a length of the order of two feet. The joints interconnecting the ends of the tubular sections are constructed in very special manner to provide for unilateral movement of adjacent tubular sections between limits, one of which is the lineal alignment of adjacent sections and the other of which is of the order of approximately 60°. This permits entry of the probe through an extended intake pipe leading to a buried tank and insures the horizontal alignment of the several rigid sections after entry into the tank and during forced probing operations interiorly of the tank. Each of the hinged joints is protected against leakage and loss of vacuum or suction pressure by an internal coupling and associated O-rings fitting within recesses in overlapping circular flanged portions of adjacent ends of the rigid tubular sections. The joints while being sealed against leakage may, nevertheless, be readily disassembled and assembled for removal and replacement of parts. The construction of probe shown herein has proven highly effective and successful in use.

Referring to the drawings in more detail, reference character 1 designates a buried tank located beneath the ground 2 and below the paving 3. The tank 1 is provided with a supply pipe 4 through which the tank may be filled and through which a pipe may be inserted for pumping the fluid contents from the tank. A conventional vent pipe is shown at 5. The probe of my invention consists of a multiplicity of rigid tubular sections illustrated at 6, 7, 8, 9, 10, 11, 12, 13, 14 and 15 connected through a coupling indicated at 16, which includes both a transparent flow pipe section and a mounting for control switch 18 to flexible hose 19 which leads to the vacuum or suction pump indicated at 20 from which the scale, sludge, dirt and other waste material is discharged through discharge outlet 21. The series connected rigid tubular sections 6–15 are hinged at their ends with respect to each other as indicated more clearly in Figs. 3–6 and 7–13, and in Fig. 15. For purposes of illustration I have shown the joint between the ends of adjacent sections 10 and 11 on an enlarged scale; each joint being similar so that a description of one joint will suffice for a description of all the joints between the several sections. The terminating ends of rigid tubular sections 10 and 11 are provided with tubular connectors shown at 22 and 23, respectively. Tubular connector 22 consists of an outwardly tapered terminus 22a, for example, extending from a sleeve 22b which is welded to the end of rigid tubular section 10. The tubular connector 23 has a tapered terminus 23a connected with a cylindrical sleeve 23b welded to the end of rigid tubular section 11. The tapered termini 22a and 23a have flat coacting internal faces represented at 22c and 23c disposed in planes which include the axes of the rigid tubular sections 10 and 11 indicated at 10a and 11a respectively. The faces 22c and 23c slidably abut each other as represented primarily in Fig. 7, and these faces are laterally recessed as indicated at 22d and 23d. These lateral recesses are transversely aligned with each other and between the recesses there is interposed a sealing means consisting of coupling ring 24 having annularly disposed recesses 25 and 26 on each end thereof. In each of the recesses 25 and 26 there is fitted a sealing O-ring shown at 27 and 28 which fit within aligned recesses 22d and 23d in the abutting faces 22c and 23c. The termini 22 and 23 are each provided with transversely disposed shoulders 22e and 23e having a depth equal to the external thickness of the flange of the adjacent coacting terminus. On each of these shoulders there is secured a plate member represented at 29 and 30. The plate members 29 and 30 are secured to the shoulders 22e and 23e, respectively, by means of screws 31 and 32 which enter screw threaded apertures provided in the respective termini within the shoulders 22e and 23e. These plate members 29 and 30 are provided with recessed peripheral edges 29a terminating in projecting ends 29b and 29c in the case of plate member 29 and a recessed edge 30a and projecting ends 30b and 30c in the case of plate member 30. The plate members 29 and 30, secured by screws 31 and 32, respectively, to the termini 22 and 23, serve as clamping means with respect to the external peripheries of the flanges 22f and 23f. The peripheral portions of these flanges 22f and 23f are cut away to provide flat external curved faces 22g and 23g which also serve as limiting abutments with respect to plates 30 and 29, respectively, for limiting the range of angular movement of the adjacent sections, as illustrated particularly in Figs. 5 and 6 where projection 29c on plate 29, and projection 30b on plate 30, collide with abutment stops provided in the areas 22h and 23h in the external curved faces 22g and 23g.

In addition to the foregoing construction required for establishing a vacuum or suction-tight angularly shiftable joint I provide a curved internal wall 22i and 23i terminating in abutment stops 22j and 23j, shown more particularly in Fig. 6. Abutment stops 22j and 23j also coact to limit the angular movement of adjacent sections, thereby insuring a rigid structure for the probe.

The limiting abutments provided on the members at the ends of adjacent tubular members coact with each other at three positions 22h—30c; 22j—23j; and 23h—29c when the sections are folded or angularly moved to the maximum angularly shiftable position as indicated in Fig. 6, whereas limiting abutments in two positions coact with each other when the members are angularly shifted to axially aligned positions as shown in Fig. 4 at 23g—29b; and 22g and 30b. The abutments in the three positions as shown in Fig. 6 are aligned in a central zone 22j—23j and symmetrically on each side thereof at 22h—30c and 23h—29c, while the abutments in the aligned positions of the tubular members are aligned symmetrically on opposite sides of the central axes of the tubular members at 23g—29b and 22g—30b as shown in Fig. 4.

The end section 6 of the probe carries a special terminus constituted by tubular member 33, shown more particularly in Figs. 2, 11 and 14. The terminus 33 fits over the end of the end section 6 of the probe and is welded thereto and is provided with a pickup orifice 34 extending at an angle to the longitudinal axis 35 of the terminating section of the probe. The end of the terminus 33 is provided with a pair of ears 36 extending from the terminus at an obtuse angle to the longitudinal axis 35 thereof viewed from the exterior of the probe, and providing a journal for guide roller 37 projecting beyond the end of the orifice 34 and offset from the axis 35 for a sufficient distance to provide a turning moment in the direction in which the sections of the probe are free to shift from a lineally aligned position whereby the guide roller, when forced into abutment with the tank bottom as the probe is introduced into the tank, as shown in Fig. 15, controls the angular shift of the sections of the probe, while insuring the movement of the probe in the proper direction as indicated by dotted line position 6' in Fig. 15 to occupy a position lineally disposed along the bottom of the tank, as represented in Figs. 1 and 2, for exposing the orifice 34 to accumulated scale, and sludge, 38 at the bottom of the tank 1 for effecting by suction pressure from pump 20 the removal thereof. The probe sections cannot move in a direction opposite to the direction of movement indicated in Fig. 15, and will retain the lineally aligned position along the bottom of tank 1 until withdrawn through the pipe 4.

When the probe is inserted into the tank 1 and the vacuum or suction pump 20 started by closing the circuit to the motor upon operation of switch 18, the operator gives the probe sections a slight twist in an axial direction within a range of approximately 180° with the probe sections maintained in positions where they will not fold or angularly shift with respect to each other. After a very short period of use the operator gets the feel of the probe to be certain that the position thereof is correct and that he is not holding the probe in a position in which the sections will commence to angularly shift with respect to each other. The probe may be forced against hardened accumulation of material within concealed parts of the tank for loosening the material and removing the material thus loosened by suction pressure.

The sections of the probe are readily disconnectable and connectable by removing and replacing screws 31 and 32 for facilitating replacement of tubular sections or replacement of parts to the sealing coupling, or for interposing sections of different lengths for meeting special tank cleaning problems.

In order to reduce unnecessary weight I may construct the series of the sections of the probe from plastic or light metal, such aluminum or magnesium.

The O-rings 27 and 28 are fitted onto the races formed by the recesses 25 and 26 and coact with the recesses 22d and 23d in tubular connectors 22 and 23, respectively, in a close fit, but providing sufficient space for a thin film of oil to fill and seal the space while angular adjustment is permitted between the connectors 22 and 23.

The advantage of the approximate 60° limitation to which the adjacent tubular members may be folded is that the probe may be packed as represented in Fig. 16 for transportation substantially in the shape of a hexagonal package and then readily unfolded when the probe is to be placed in operation. Also, the hexagonal-shape of the folded package, as represented in Fig. 16, facilitates storage of the probe in a compact space when it is not in use.

While I have described my invention in certain of its preferred embodiments I realize that modifications may be made and I desire that it be understood that no limitations upon my invention are intended other than may be imposed by the scope of the appended claims.

What I claim as new and desire to secure by Letters Patent of the United States is as follows:

1. A terminus for a tubular probe comprising a hollow tubular end section having a surface-engaging face disposed at an acute angle to the axis of the end section, said end section having an orifice in said surface engaging face disposed at an angle to the axis of the hollow tubular end section, and a roller journaled adjacent the end of said surface-engaging face offset from the axis of said hollow tubular end section.

2. A probe terminating in a tubular end section, said tubular end section having an end portion extending at an angle to the longitudinal axis of the tubular end section and terminating in an orifice, bracket means mounted on the tubular end portion of said tubular end section and extending beyond one side of the longitudinal axis of said tubular end section, a roller journaled in said bracket means on an axis wholly offset from the longitudinal axis of said tubular end section and spaced from the axis of the end portion of said tubular end section.

References Cited in the file of this patent

UNITED STATES PATENTS

| | | |
|---|---|---|
| 494,402 | Walsh | Mar. 28, 1893 |
| 844,740 | Patterson | Feb. 19, 1907 |
| 856,427 | Schulz | June 11, 1907 |
| 913,811 | Clasen | Mar. 2, 1909 |
| 951,516 | Stephens | Mar. 8, 1910 |
| 1,023,924 | Corbett | Apr. 23, 1912 |
| 1,822,260 | Adams | Sept. 8, 1931 |
| 2,332,940 | Senke | Oct. 26, 1943 |
| 2,461,517 | Carnevale | Feb. 15, 1949 |
| 2,601,857 | Smith | July 1, 1952 |
| 2,612,998 | Smith | Oct. 7, 1952 |

FOREIGN PATENTS

| | | |
|---|---|---|
| 3,476 | Australia | of 1926 |